Figure 1:
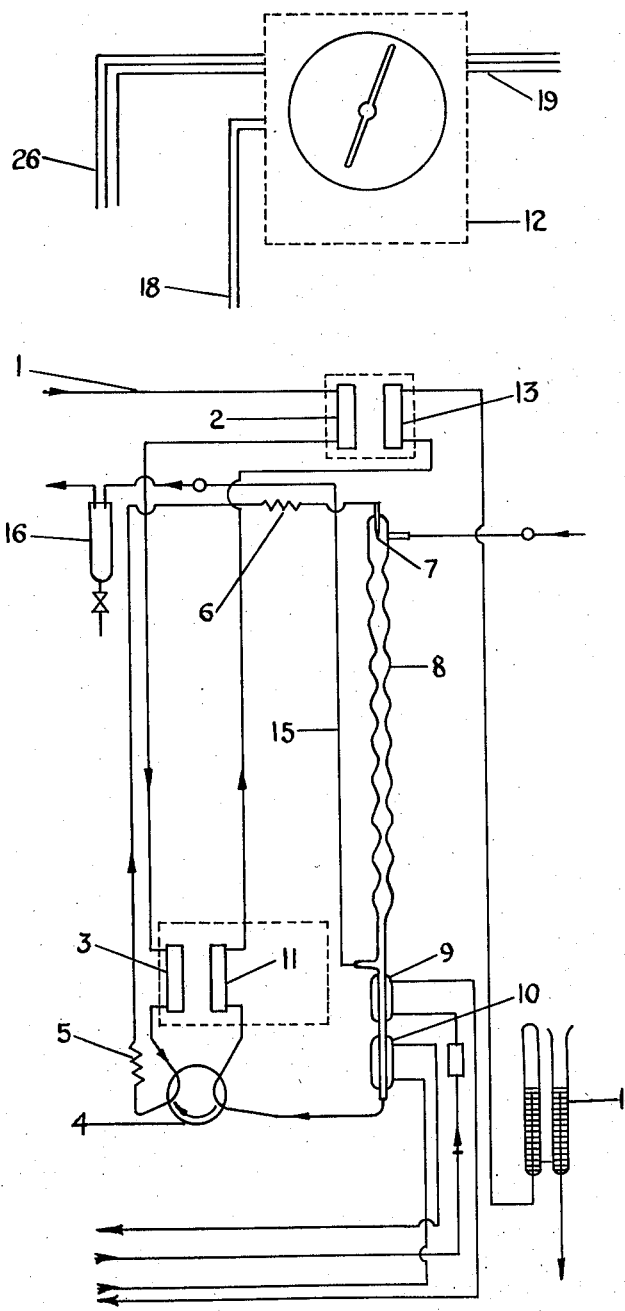

INVENTORS:
Thomas Barley,
Joseph Henderson Elliott,
Richard Phillip Kinsey,

April 1, 1958 T. BARLEY ET AL 2,829,032
APPARATUS FOR CONTINUOUSLY DETERMINING SMALL
AMOUNTS OF ONE GAS IN ANOTHER
Filed April 26, 1954 2 Sheets-Sheet 2

INVENTORS:
Thomas Barley,
Joseph Henderson Elliott, &
Richard Phillip Kinsey,
BY Cushman, Darby & Cushman
ATTORNEYS.

United States Patent Office 2,829,032
Patented Apr. 1, 1958

2,829,032

APPARATUS FOR CONTINUOUSLY DETERMINING SMALL AMOUNTS OF ONE GAS IN ANOTHER

Thomas Barley, Weaverham, and Joseph Henderson Elliott and Richard Phillip Kinsey, Northwich, England, assignors to Imperial Chemical Industries Limited, a corporation of Great Britain Application April 26, 1954, Serial No. 425,706

Claims priority, application Great Britain May 8, 1953

9 Claims. (Cl. 23—254)

This invention relates to an improved apparatus for continuously determining small amounts of one gas in another.

In many chemical processes in which one of the reactants is a gas it is important to provide the latter in a state of purity or at any rate, if impurities cannot be entirely eliminated, to keep their proportions within limits. It is also often necessary to control the concentration of gases and vapours in the air circulating in spaces where certain processes are being carried on, for example in the manufacture of viscose rayon, or to control the amount of oxygen and carbon monoxide in flue gases or the carbon dioxide content of the air in refrigerated food stores. To effect this kind of control it is necessary to have some means of readily determining the proportions of one gas in another and if the chemical or other process involves continuous gas flow it becomes important for this means to be continuous also.

Various instruments are available for analysing mixtures of gases and these are based on such properties of gases as their thermal conductivity, density, power to absorb infra-red radiation, and their absorption in solutions with which they react chemically. Efficient as some of these instruments are they are not applicable to the determination of very small amounts of gases, within the range 0–50 parts per million for example, and to an accuracy of 0.5 part per million. The object of the present invention is to provide an apparatus able in a continuously flowing mixture of gases to determine continuously with an accuracy of 0.5 part per million amounts of the order of 0–50 parts per million of one gas in the mixture. The method of operation of the apparatus is based on measurements of the colour change of a solution that occurs when a gas is absorbed by it. If oxygen is the gas present in small amounts suitable absorbing solutions would be of alkaline pyrogallol which changes from nearly colourless to shades of brown, or of ammoniacal cuprous chloride which changes from colourless to blue on absorption of oxygen. To determine sulphur dioxide one might use an acid solution of potassium permanganate which would change through shades of reddish-purple to colourless; for chlorine a solution of potassium iodide could be used which would change from colourless to shades of yellow and brown. Other combinations could no doubt be suggested.

According to this invention we provide an apparatus comprising an absorber unit in which the mixture of gases is contacted co-currently and continuously with a solution that absorbs that gas which is present in very small amounts and changes colour or depth of colour as a result, a means for supplying solution and gas to the unit at controllable rates, and a means whereby the colour changes of the solution are measured and recorded. Another feature of this invention is the use of a combination of a photoelectric absorptiometer and a continuous re-balancing recorder to measure and record colour changes in the solution. The measuring system of the absorptiometer and recorder operates as follows. Two photoelectric cells are connected in adjacent arms of a Wheatstone bridge measuring circuit. A source of light is reflected from the mirror of a shunted mirror galvanometer and is then incident on one cell after passing through the reference or standard solution, and on the other cell after passing through the coloured sample or analysing solution. The light source and mirror galvanometer are so arranged that the light beam reflected from the mirror is wide enough to spread over both cells. That cell masked by the analysing solution is always wholly illuminated by the beam, but the beam and the cell masked by the reference solution are so positioned that this cell is partially illuminated by the beam, the extent of the illumination depending on the position of the mirror and therefore of the deflection of the galvanometer. The amounts of light reaching the two cells depend on the degrees of absorption by the solutions. For example, when the analysing solution darkens less light passes through it to the cell behind which consequently generates less electromotive force, and as a result an out-of-balance electromotive force is produced in the Wheatstone bridge circuit. This electromotive force is amplified, because by itself it is too small to operate a recording device and a shunted galvanometer, and the output current drives a servomotor and actuates the shunted galvanometer. The servomotor in turn alters the position of the movable contact on a slidewire which forms part of the shunt circuit supplying current to the mirror galvanometer. The direction and magnitude of the galvanometer mirror movement is therefore related to the position of the slidewire contact. The motor will continue to drive until the position of this contact is such that the galvanometer mirror has restored the light balance at the photoelectric cells; when this condition is reached there is no longer any out-of-balance electromotive force from the photoelectric cell bridge, and the motor will stop. The deflection of the galvanometer mirror is therefore proportional to the amount of absorption in the analysing liquor; this deflection is indicated by a pointer and pen recorder mechanically coupled to the carriage of the movable slidewire contact.

For such an apparatus to function continuously and to be sensitive enough to measure amounts of gas of the order of 0–50 parts per million with an accuracy of 0.5 part per million it is essential for the absorption of gas by the solution to be complete and rapid. To secure this we provide a new and improved type of absorber unit consisting essentially of three parallel hollow glass columns, alike and of the same dimensions and located so that each lies along an edge of the same imaginary equilateral triangular prism. The upper ends of the columns are joined into a glass distributing head whose purpose is to introduce absorbing solution in equal volumes into each column. The lower ends of the columns are united in a common tube for conveying the solution to the absorptiometer cells. Along its length each column consists alternately of wide sections and precision bore capillary sections so that in outline it is alternately ellipsoidal and parallel-sided. Form 6–12 ellipsoidal sections is a suitable number, their major axis is preferably from 45–50 mm., their minor axis 20–25 mm., and the diameter of the capillary sections is conveniently from 1–5 to 2.0 mm. A suitable length for each column is 18–24 inches. The gas under examination flows co-current with the absorbing solution down the insides of the columns, in fact the gas flow is necessary to cause the solution to descend progressively for without it the solution would hold up in the capillaries. It is a characteristic of this design that in the ellipsoidal parts of the columns the solution falls as a film on the glass and the gas is thus in surface contact with this, whilst in the capillaries the solution intermittently bridges the bore and then gas bubbles through it and also pushes it downwards. The glass distributing head consists of an upper part joined by a short length of precision bore glass capillary tube to the lower part. Into the roughly circular base of the lower part are joined by precision bore capillary tubing the tops of the three columns at points equally spaced round the circumference. The centre of this circular base is slightly raised inside to form a small symmetrically placed plateau on to which absorbing solution drips from the upper part of the distributing head, and down whose slopes it then flows to the tops of the three columns. The slops of the plateau are very carefully contoured to distribute solution equally to each of the three columns. Solution and gas both enter the distributing head through this upper part, the solution through a tube placed vertically over the capillary that connects upper and lower parts, the gas through a tube at the side.

We have found that in glass absorber units of the size and design already described complete absorption of a gas from a carrier gas in which it is present to the extent of 0–50 parts per million can be achieved with a total gas flow of the order of 500–600 mls. per minute and an absorbing solution flow of the order of 2.5–3.5 mls. per minute. Gas may be supplied to the apparatus at a pressure as low as 20 inches water gauge if desired provided exhaust is to atmosphere; thus gas may be sampled from cylinders or low pressure lines. If samples are required from a system at higher pressures any conventional method of reducing to about 6 lbs./sq. in in may be used. Flowmeters of normal pattern measure rate of gas flow.

The broad working principle of the apparatus is that virgin absorbing solution first passes through two reference or zero glass absorptiometer cells, one of which is for visual observation the other for photoelectric measurements, then through the absorber unit where it changes colour owing to absorption of gas. On leaving the absorber unit the solution is heated slightly and then cooled by means of hot and cold water jackets in order to prevent bubbles forming in the comparison or working glass absorptiometer cell through which it passes next, and where its colour is compared photoelectrically with that it possesses in its virgin state. Any colour difference detected by the photoelectric cell is converted into an electrical signal which is fed into the recorder, amplified and recorded continuously on a chart previously calibrated by passing gas of known composition through the apparatus. By means of the zero visual cell the colour of the virgin solution can be compared directly by eye with that of solution that has absorbed gas. A series of colour filters mounted in a disc could be interposed in the light path of the zero cell and a colour match obtained. The value of each filter in parts per million of absorbed gas being known by previous calibration it would then be possible to make by eye a direct comparison of results with those given by the photoelectric absorptiometer system. This test being subjective one ought not to attach too much importance to any differences between its results and those given by the photoelectric system. The real value of a visual comparison is in detecting the existence of gross errors in the instrument due to such things as unsatisfactory absorbing solution, failure of some part of the electrical system, gas bubbles or dirt in one or other of the absorptiometer cells etc.

Absorbing solution may be stored in one or two aspirators mounted on a shelf adjustable for height so that they can supply solution at the required rate to calibrated drip pipes. Two aspirators are provided where the absorbing solution proper is made up from separate solutions. The solutions on leaving the aspirators first pass through glass wool filters and cold water jackets and then to calibrated drip pipes which deliver them into a mixing chamber. A hot water jacket with water at a temperature of about 30° C. above ambient surrounds the mixing chamber and a cold water jacket is placed immediately below it. It is necessary to provide for heating and cooling of the absorbing solution in this way in order to remove from is dissolved air or other carrier gas which otherwise, being released as bubbles inside the solution lines, absorptiometer cells, etc. and the main part of the apparatus owing to this part being usually at a somewhat higher temperature, would interfere with readings.

Figure 3:
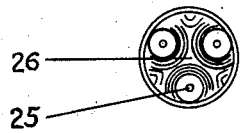
Figure 2:
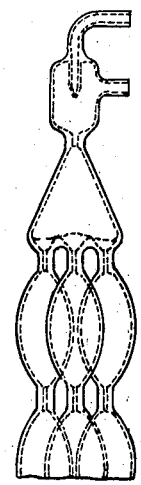
Figure 2:
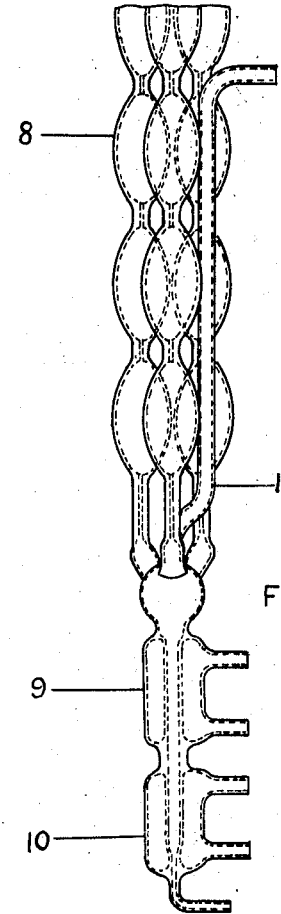

The apparatus may be further described by means of the accompanying drawings in which Figure 1 is a flow diagram representing the paths of the absorbing solution and gas, whilst Figures 2 and 3 respectively show a side elevation of the absorber unit and a cross-section of the base of the distributing head into which the tops of the columns are joined. In Figure 1 for convenience the aspirators, drip pipes and their associated filters and water jackets as well as the photoelectric cells and leads are omitted, and one only of the three glass columns forming the absorber unit is shown. The other figures show the absorber unit in some detail.

In Figure 1 absorbing solution arrives from the aspirator unit at 1 and passes successively through the zero visual cell 2 and zero absorptiometer cell 3, then on through a control tap 4 and two capillary restrictors 5 and 6 to the distributing head 7 at the top of the glass absorber unit 8. The capillary restrictors serve to stabilize the solution flow against back pressure due to the gas entering the absorber unit. In the absorber unit the solution flows down co-currently with the gas which entered also at the distributing head, and from the bottom of the unit the solution passes through a hot water jacket 9 and a cold water jacket 10 whose functions are the same as those in the solution feed system already described namely to remove dissolved gases. The solution having absorbed from the carrier gas the gas whose proportion is being estimated now passes through the working cell 11 of the absorptiometer where its colour is compared photoelectrically with that of virgin solution. Any colour difference is thus detected and converted into an electrical signal which is fed into the recorder 12, amplified and recorded on a suitable calibrated chart. The signal leads from the photoelectric cells, re-balancing loop leads to the galvanometer and the mains supply leads are shown respectively by 17, 18 and 19. From the working cell 11 the solution flows to the visual working cell 13 and then on to a lute system 14 which serves to balance the pressure of the absorber unit and to prevent flow of gas through the solution lines. It then passes to waste. Carrier gas leaves the absorber by the tube 15 and passes away to atmosphere via the water trap 16.

The solution control tap 4 is designed to have two positions, the first for normal working and the second to allow of a solution zero check i. e. to balance the photoelectric system by having identical solutions in each of the absorptiometer cells. In this second position the zero cell is connected directly with the working cell so that virgin solution flows through both in series, the absorber unit being effectively sealed off at solution entry and exit points so that no contact with gas can occur.

In Figure 2, which shows the absorber unit 8, the upper part of the distributing head, shown by 20, is connected to the lower part 21 by the precision bore capillary tube 22. The tube that admits absorbing solution to the distributing head is shown by 23 whilst that for the gas is shown by 24. Figure 3 represents a cross-section of the base of the lower part of the distributing head showing how the tops of the three columns are joined in. 25 shows one such top and its joint. The small plateau symmetrically placed with respect to the tops of the columns and vertically beneath the capillary 22 is shown by 26. The contour lines in Figure 3 are meant to depict the slopes leading from the plateau to the tops of the columns. The hot and cold water jackets are shown in Figure 2 by 9 and 10 respectively and the tube that leads away carrier gas by 15.

What we claim is:

1. An absorber unit for use in continuously determining very small amounts of one gas in another in which the mixture of gases is contacted co-currently and continuously with a solution that absorbs the gas that is present in very small amounts and changes color as a result, said absorber unit comprising a hollow column, consisting along its length of arcuate sections and of precision-bore capillary sections arranged alternately.

2. The apparatus of claim 1 wherein said absorber unit comprises a plurality of parallel hollow columns and a distributor head into which the upper end of each column is joined, and a common tube into which the lower ends of the columns are joined.

3. The apparatus of claim 2 in which there are three parallel hollow columns and the distributor head feeds the solution in substantially equal amounts to each column.

4. An apparatus as claimed in claim 1 in which the absorber unit comprises three parallel, hollow glass colums, alike and of the same dimensions, and wherein the arcuate sections are ellipsoidal sections located with respect to one another so that they lie along the three edges of an imaginary equilateral triangular prism, a glass distribution head into which the upper end of each column is joined, and a common tube into which the lower ends of the columns are joined.

5. An apparatus as claimed in claim 4 in which the distribution head into which the upper ends of the three columns are joined consists of an upper part having entries for gas and solution, joined by a short length of precision-bore straight-sided capillary tube to a lower part having a substantially circular base into which are joined at points spaced equidistantly round the circumference the upper ends of the three columns, said base having a central portion slightly raised inside to form a small plateau symmetrically placed with respect to the ends of the three columns, the centre of the plateau being in line with the bore of the precision-bore straight-sided capillary tube and the slopes contoured so that solution falling on to it flows down them in substantially equal volumes to the three columns.

6. An apparatus as claimed in claim 4 in which the columns of the absorber unit are from 18 to 24 inches in length.

7. An apparatus as claimed in claim 4 in which the ellipsoidal sections of each column are from 6 to 12 in number.

8. An apparatus as claimed in claim 4 in which the minor axis of an ellipsoidal section of a column is from 20 to 25 millimeters and the major axis from 45 to 50 millimeters in length.

9. An apparatus as claimed in claim 4 in which the diameter of the precision-bore straight-sided capillary sections of a column is from 1.5 to 2.0 millimeters.

References Cited in the file of this patent

UNITED STATES PATENTS

| 1,919,858 | Pettingill | July 25, 1933 |
| 2,077,427 | Lissman | Apr. 20, 1937 |
| 2,356,530 | Pflock | Aug. 22, 1944 |
| 2,382,381 | Calvert et al. | Aug. 14, 1945 |
| 2,395,489 | Major et al. | Feb. 26, 1946 |
| 2,430,895 | Tuve et al. | Nov. 18, 1947 |

FOREIGN PATENTS

| 678,100 | Germany | July 8, 1939 |

OTHER REFERENCES

Schaar & Co.: Selected Lab. Equipt. Catalog No. 50, 754 W. Lexington St., Chicago, Ill. (1950), pp. 169, 323.

Ace Gen'l Catalog "40," Ace Glass Incorp., Vineland, New Jersey (1940), page 113.